Feb. 13, 1945.   C. B. SPASE   2,369,417
CLUTCH THROW-OUT MECHANISM
Filed Dec. 16, 1942   2 Sheets-Sheet 1
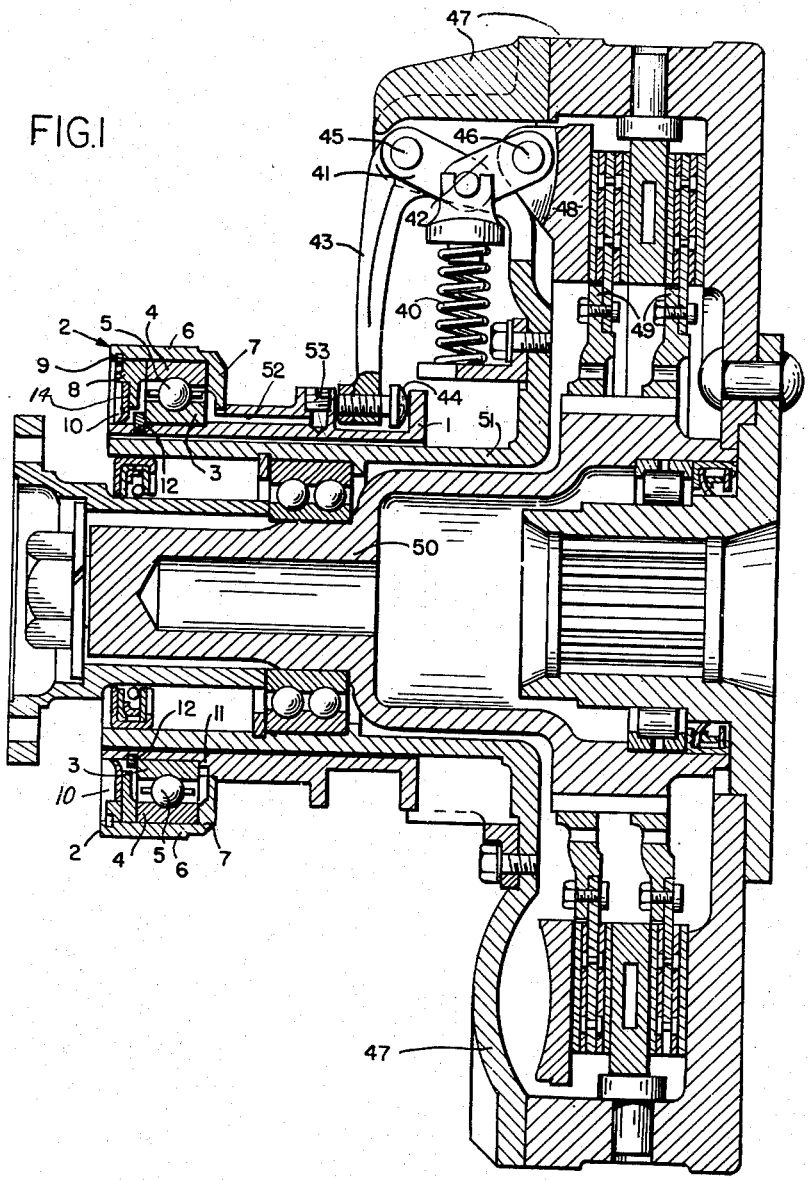
INVENTOR.
CHARLES B. SPASE
BY Bodell & Thompson
ATTORNEYS

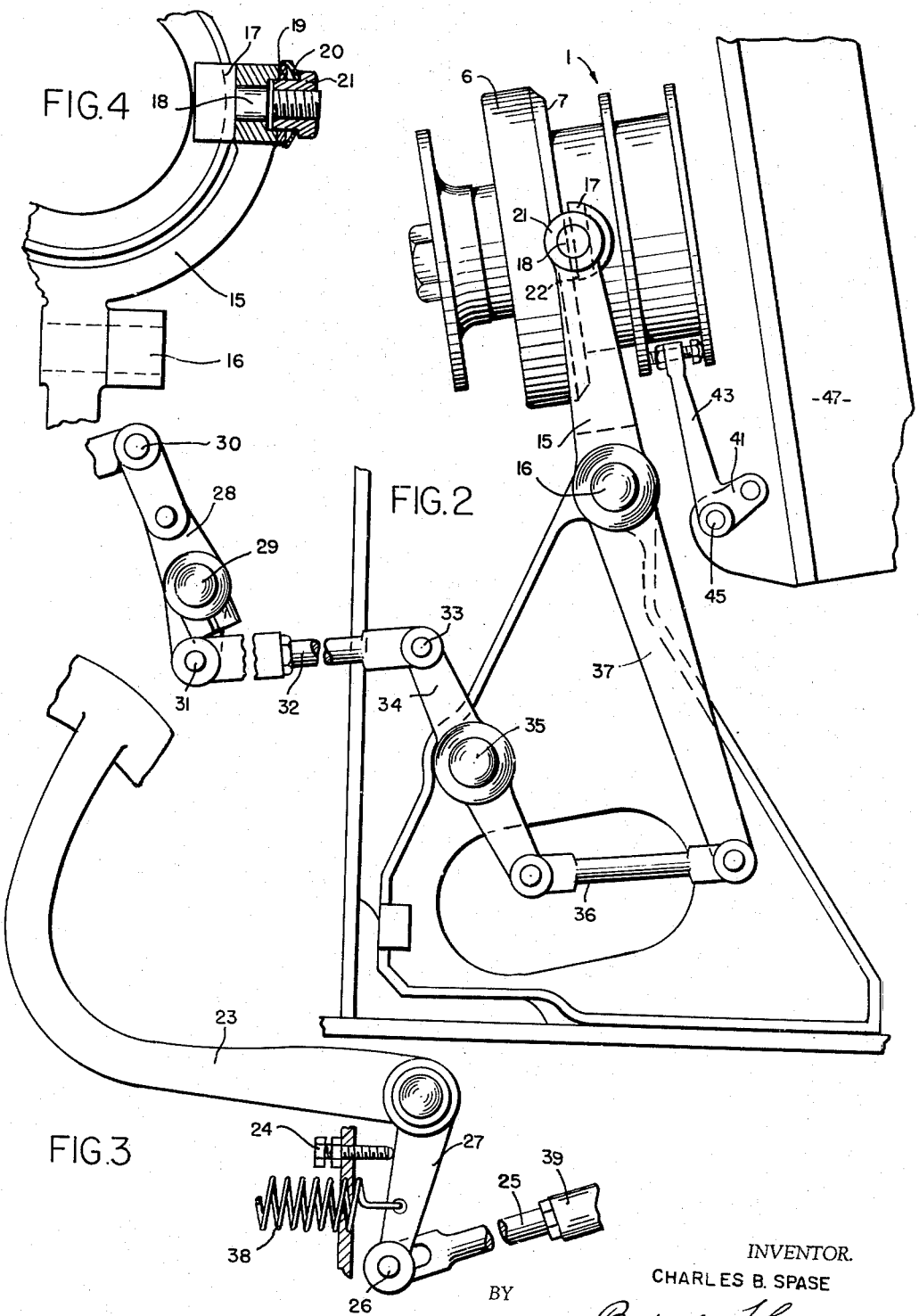

Patented Feb. 13, 1945

2,369,417

UNITED STATES PATENT OFFICE 2,369,417

CLUTCH THROWOUT MECHANISM

Charles B. Spase, Nedrow, N. Y., assignor to Lipe-Rollway Corporation, Syracuse, N. Y., a corporation of New York Application December 16, 1942, Serial No. 469,189

1 Claim. (Cl. 192—98)

This invention relates to throw-out mechanism for clutches, such as are used in the automotive field, and has for its object a throw-out mechanism wherein the thrust members on the throw-out fork or yoke are idle and not subject to friction or rotation, when the clutch is in operation, but only when the clutch is thrown out. Heretofore in clutches of this type, the arms of the throw-out yoke or fork have been provided with rollers, which coact with an annular radial shoulder, as the side of a groove, on the throw-out sleeve. The rollers rotate at a very high speed during the normal operation of the clutch and quickly wear out or become loose, even when the rollers are of the antifriction type, and the rotation of the rollers develops, even when provision is made in the throw-out yoke mechanism or the clutch pedal mechanism to hold the rollers normally slightly spaced from the shoulder. The wearing of the rollers in heavy-duty clutches has been a source of difficulty. The principal object of the invention is throw-out mechanism in which the throw-out rollers are eliminated, and also in which any wear while the clutch is in operation in the throw-out mechanism, because of the engagement of rotating and non-rotating parts, is eliminated.

The invention consists in the novel features and in the combinations and constructions hereinafter set forth and claimed.

In describing this invention, reference is had to the accompanying drawings in which like characters designate corresponding parts in all the views.

Figure 1 is a fragmentary sectional view of one type of clutch embodying this invention, parts being omitted.

Figure 2 is a fragmentary side elevation of the clutch and the clutch pedal mechanism.

Figure 3 is a fragmentary elevation of the clutch pedal and contiguous parts.

Figure 4 is a fragmentary elevation of the throw-out yoke and contiguous parts, the arm of the throw-out yoke being shown in section illustrating the mounting for the throw-out shoes.

This invention comprises, generally, a throw-out sleeve or collar having a radial thrust bearing thereon including inner and outer raceways, a housing for the bearing, fixed to the outer raceway, and a throw-out yoke, which is usually pedal operated, having means, as shoes, to thrust against the housing axially relatively to the axis of the clutch, upon the throwing out operation of the yoke by the pedal.

The invention is here shown as embodied in a heavy-duty clutch of the type shown in Patent No. 2,280,357, issued April 21, 1942, although it may be embodied in any clutch mechanism including an axially shiftable throw-out sleeve or collar.

1 designates an axially shiftable throw-out collar or sleeve, and 2 the radial thrust bearing thereon including an inner raceway 3, an outer raceway 4, and members, as balls 5, between them. 6 is the housing for the radial thrust bearing, it being fixed to the outer raceway and having a radial thrust surface 7 at a right angle to the axis of the clutch, with which the throw-out yoke coacts. The housing 6 includes an annular body which is angular in cross-section providing an inwardly extending radial flange on the outer side of which the thrust surface 7 is provided, the opposite side of the body being open and closed by a retaining ring 8, which thrusts against the side of the outer raceway opposite to that thrusting against the inwardly extending flange on which the thrust surface 7 is provided. The retaining ring is held in position by a lock ring 9. The retaining ring is also formed with an annular recess 10 on its outer side, which opens through the inner circumferential face of the retaining ring toward the periphery of the throw-out sleeve 1, this recess being for the purpose of receiving an oil seal fitted thereinto by a drive fit. The inner raceway 3 is interposed between a peripheral annular shoulder 11 on the sleeve 1 and a lock ring 12. The oil seal may be of any suitable construction including a wiper and is usually of the general construction shown at 14.

15 designates a throw-out yoke or fork, this being shown as mounted upon a rock shaft 16. 17 designates shoes for coacting with the thrust surface 7, these being pivotally mounted in the yoke arms, and friction means are provided for restraining the shoes from pivotal movement. As here shown, the shoes are mounted on studs 18 extending through the yoke arms and held from pivotal movement by a friction washer 19 thrusting against the yoke arm under the influence of a spring washer 20, this spring washer being interposed between the head of a nut 21 threading on the stud 18 and the friction washer 19. The throw-out yoke or pedal mechanism is so adjusted that when the clutch is "in" or engaged, these shoes are spaced from the thrust surface 7, as shown by the space at 22.

The means for operating the yoke to disengage the clutch, that is, the clutch pedal mechanism, includes a clutch pedal 23, and motion transmitting means between it and the yoke 15 or the shaft 16 on which it is mounted. This clutch pedal mechanism includes means, as a spring, for returning the clutch pedal to starting position, and when in starting position, the yoke 15 is actuated far enough in a retrograde direction to provide the space 22 between the shoes 17 and the thrust surface 7. This adjustment may be effected by adjustable means in the connections themselves to compensate for wear of the friction clutch faces, and hence change in starting position of the throw-out collar or sleeve 1; or an adjustable stop, as a set screw 24, may be provided for this purpose. The connections between the clutch pedal and the yoke, as here shown, includes a link 25 connected at one end at 26 to an angular arm 27 on the pedal lever 23 or the shaft on which it is mounted, a lever 28 mounted between its ends at 29 and connected at one end at 30 to the link link 25 and at its other end at 31 to one end of a link 32, the other end of which is connected at 33 to one arm of the lever 34 pivoted between its ends at 35, the other end of which is connected at 33 to one arm of the lever 34 pivoted between its ends at 35, the other end of which is connected by a link 36 to a lever arm 37 on the yoke 15. The clutch pedal is returned to a predetermined starting position by means of a spring 38 and the adjustment, before referred to, to maintain the space at 22 may be effected by an adjustment, as a turn-buckle 39, in any part of the motion transmitting connections, as in the link 25 or by the set screw 24.

The clutch is held engaged, and hence the clutch pedal returned toward starting position by the clutch spring or springs. In the illustrated embodiment of the invention, the clutch springs 40 act to engage the clutch through toggle links 41, 42 by moving the folded toggle links toward straightened position. This movement through radial levers 43 rigid with one of the links 41, 42, as the link 41 returns the throw-out sleeve or collar 1 toward starting position, or to the right (Figure 1), and hence tends to return the clutch pedal toward starting position. When the clutch is engaged, the levers 43 rotating with the clutch, also by reason of their co-action at 44 with the throw-out collar or sleeve 1 tend to rotate the throw-out sleeve. Such rotation also tends to rotate the outer raceway 4 from the inner raceway. Also, the friction between the oil seal in the recess 10 and the throw-out sleeve tends to rotate the outer raceway. When the clutch is engaged and the shoes 17 spaced from the thrust surface 7, the shoes would tend to tilt so as to drag on the surface 7. This tilting is prevented by the action of the friction washer 19 and spring washer 20 which restrains the pivotal movement. The toggle links 41, 42 are pivoted, respectively, at 45 and 46 to the driving element 47 of the clutch and to the pressure ring 48, which rotates with the driving element. The driven element of the clutch, here shown, includes one or more friction disks 49 rotatable with a shaft 50. The shaft 50 extends through a hub 51 on the driving element 47. The throw-out sleeve 1 slides axially of the hub 51, all as in the patent before referred to. As here shown, the throw-out collar or sleeve 1 is provided with an oil or grease duct 52 opening into the housing 6 to supply lubricant to the radial thrust bearing 2, this duct being normally closed by a removable plug 53.

In operation, the shoes 17 are normally spaced from the thrust surface 7. Upon depression of the clutch pedal 23, the shoes are brought into engagement with the surface 7 and the throw-out collar or sleeve 1 thrusts out or to the left (Figure 1), the outer raceway 4 and the housing 6 then being held comparatively stationary. When the clutch is re-engaged by releasing the pedal 23, the clutch springs 40 re-act to re-engage the clutch and return the throw-out sleeve or collar 1 to the left, and the spring 38 further acting on the clutch pedal and its connection shifts the shoes 17 out of engagement with the thrust surface 7.

What I claim is:

In a friction clutch which includes springs biased to engage the clutch, an axially shiftable throw-out sleeve operable to disengage the clutch against the action of the springs having a thrust bearing having an annular flat surface in a plane at a right angle to the axis of the sleeve, and a throw-out yoke; the combination of shoes carried by the yoke and operable to thrust against said surfaces upon the throwing out operation of the yoke, the shoes being pivotally mounted on the yoke, spring means operable to return the yoke to a predetermined starting position, wherein the shoes are normally spaced from said surface and hence out of contact therewith when the clutch is engaged, and friction means for preventing pivotal movement of the shoes when the clutch is disengaged and hence preventing tilting of the shoes into a position, whereby they drag on said surface when the clutch is engaged and thereby maintain the spacing of the shoes at all points from said surface.

CHARLES B. SPASE.